(12) United States Patent
Ishii

(10) Patent No.: US 6,519,409 B1
(45) Date of Patent: *Feb. 11, 2003

(54) APPARATUS FOR RECORDING A HIGH QUALITY SIGNAL

(75) Inventor: Kanju Ishii, Yokohama (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/158,083

(22) Filed: Sep. 22, 1998

(30) Foreign Application Priority Data

Sep. 24, 1997 (JP) .............................................. 9-276456
Dec. 24, 1997 (JP) .............................................. 9-366526
Jan. 21, 1998 (JP) ............................................ 10-023968

(51) Int. Cl.[7] .............................. H04N 5/91; H04N 7/00
(52) U.S. Cl. ........................................... 386/46; 386/35
(58) Field of Search ................................ 386/1, 33, 37, 386/46, 35, 123, 111, 113, 124, 40; 360/25, 31, 61, 65, 67–68; H04N 5/76, 5/92, 9/79

(56) References Cited

U.S. PATENT DOCUMENTS

| | | | | |
|---|---|---|---|---|
| 4,963,991 A | * | 10/1990 | Honjo | 386/37 |
| 5,394,275 A | * | 2/1995 | Iketani et al. | 386/123 |
| 5,448,369 A | * | 9/1995 | Lee et al. | 386/123 |
| 5,499,145 A | | 3/1996 | Azuma et al. | |
| 5,583,648 A | * | 12/1996 | Ichinoi et al. | 386/37 |
| 5,598,273 A | * | 1/1997 | Kurisaki et al. | 386/9 |
| 5,740,309 A | * | 4/1998 | Mimura | 386/46 |
| 6,393,194 B1 | * | 5/2002 | Mikami et al. | 386/46 |

* cited by examiner

Primary Examiner—Thai Tran
(74) Attorney, Agent, or Firm—Louis Woo

(57) ABSTRACT

In a magnetic recording apparatus, an input video signal is processed into a processing-resultant video signal having a first given frequency band. The processing-resultant video signal is recorded on a standard magnetic tape which is designed to record a standard-format video signal having a second given frequency band narrower than the first given frequency band.

10 Claims, 11 Drawing Sheets

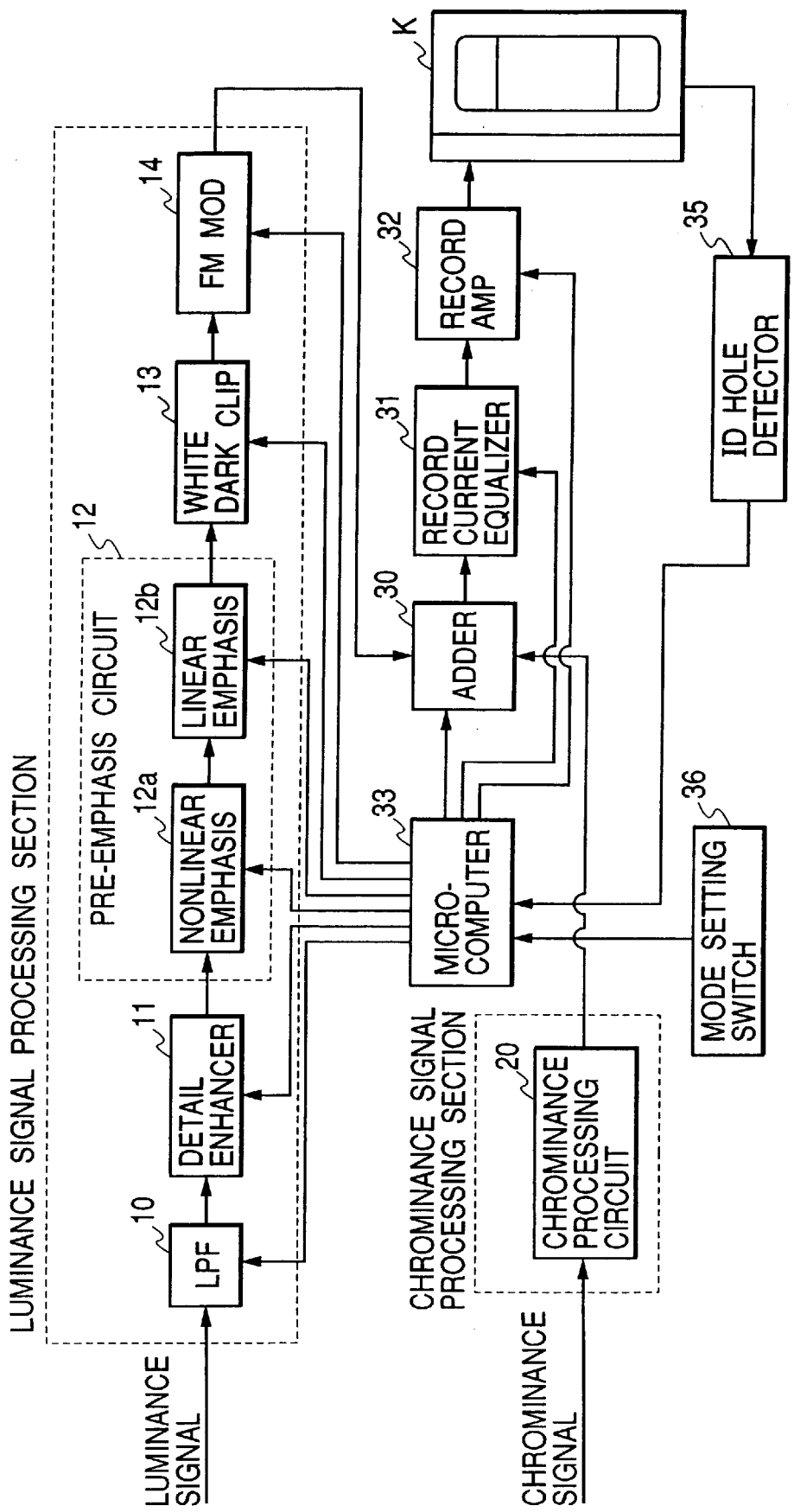

APPARATUS FOR RECORDING A HIGH QUALITY SIGNAL

BACKGROUND OF THE INVENTION

1. Field of the Invention

This invention relates to an apparatus for recording a video signal on a magnetic tape.

2. Description of the Related Art

Some video tape recorders (VTR's) are based on a standard format referred to as a VHS format. There is an S-VHS format which improves over the VHS format. A VTR of the S-VHS standard can record and reproduce a video signal which is wider in frequency band and higher in picture quality than a video signal handled by a VTR of the VHS standard.

The VTR of the S-VHS standard uses an exclusive magnetic tape referred to as an S-VHS tape. The S-VHS tape is designed to more suit with a video signal having a wide frequency band and short wavelengths in comparison with a VHS tape.

In the VTR of the VHS standard, a video signal to be recorded is separated into luminance and chrominance signals. The luminance signal is converted or modulated into an FM (modulated) luminance signal having a frequency deviation of 3.4 to 4.4 MHz. The chrominance signals are down-converted into a low frequency band around 629 kHz. The FM luminance signal and the frequency-down-converted chrominance signals are combined before being recorded on a VHS tape.

In the VTR of the S-VHS standard, a video signal to be recorded is separated into luminance and chrominance signals. The luminance signal is converted or modulated into an FM (modulated) luminance signal having a frequency deviation of 5.4 to 7.0 MHz. The chrominance signals are down-converted into a low frequency band around 629 kHz. The FM luminance signal and the frequency-down-converted chrominance signals are combined before being recorded on an S-VHS tape.

The VTR of the VHS standard can use an S-VHS tape instead of a VHS tape. In general, the VTR of the S-VHS standard can operate in each of two different modes, a VHS mode and an S-VHS mode. During the VHS mode of operation of the S-VHS VTR, a video signal of the VHS format is recorded on a VHS tape or an S-VHS tape. During the S-VHS mode of operation of the S-VHS VTR, a video signal of the S-VHS format is recorded on an S-VHS tape.

In general, an S-VHS tape is contained in a cassette having an identification hole which indicates that the tape therein is of the S-VHS type. The VTR of the S-VHS standard has a function of sensing an identification hole in a tape cassette placed therein. When the S-VHS VTR senses an identification hole in a tape cassette, the S-VHS mode of operation is automatically started. On the other hand, when the S-VHS VTR fails to sense an identification hole in a tape cassette, the VHS mode of operation is started.

An advanced VTR detects characteristics of a used magnetic tape, and records a video signal on the magnetic tape under recording conditions (that is, the VHS mode or the S-VHS mode) determined in response to the detected tape characteristics. The advanced VTR can optimize signal recording tape by tape. Specifically, the advanced VTR implements a preliminary process before the recording of a video signal. During the preliminary process, the advanced VTR records and reproduces a test signal on and from a used magnetic tape. The advanced VTR detects characteristics of the magnetic tape (that is, the VHS standard tape or the S-VHS tape) from the reproduced test signal. Then, the advanced VTR records a video signal on the magnetic tape under recording conditions determined in response to the detected tape (the VHS standard tape or the S-VHS tape) characteristics.

As previously explained, the S-VHS VTR operates in the VHS mode when a VHS tape is used. Some VHS tapes have improved characteristics sufficient to store wide-band and high-quality video signals. In general, S-VHS tapes are higher in price than VHS tapes.

SUMMARY OF THE INVENTION

It is an object of this invention to provide a magnetic recording apparatus which can record a wide-band and high-quality video signal on an inexpensive magnetic tape such as a VHS tape.

A first aspect of this invention provides a magnetic recording apparatus comprising first means for processing an input video signal into a processing-resultant video signal having a first given frequency band; and second means for recording the processing-resultant video signal, which is generated by the first means, on a standard magnetic tape which is designed to record a standard-format video signal having a second given frequency band narrower than the first given frequency band.

A second aspect of this invention provides a magnetic recording apparatus comprising first means for processing an input video signal into one among a first standard-format video signal having a first given frequency band, a second standard-format video signal having a second given frequency band wider than the first given frequency band, and a processing-resultant video signal having a third given frequency band wider than the first given frequency band; second means for recording the first standard-format video signal, which is generated by the first means, on a first standard magnetic tape which is designed to record a first standard-format video signal; third means for recording the second standard-format video signal, which is generated by the first means, on a second standard magnetic tape which is designed to record a second standard-format video signal; and fourth means for recording the processing-resultant video signal, which is generated by the first means, on the first standard magnetic tape.

A third aspect of this invention is based on the second aspect thereof, and provides a magnetic recording apparatus further comprising fifth means for, in response to user's request, deciding which of the first, second, and third standard-format video signals the first means processes the input video signal into; and sixth means for recording the video signal, which is decided by the fifth means, on a magnetic tape.

A fourth aspect of this invention is based on the second aspect thereof, and provides a magnetic recording apparatus wherein the processing-resultant video signal can be reproduced from the first standard magnetic tape by a magnetic reproducing apparatus for a second standard-format video signal and a second standard magnetic tape.

A fifth aspect of this invention is based on the second aspect thereof, and provides a magnetic recording apparatus further comprising fifth means for detecting whether or not the first standard magnetic tape is suited to recording of the process-resultant video signal.

A sixth aspect of this invention is based on the fifth aspect thereof, and provides a magnetic recording apparatus wherein the fifth means comprises sixth means for recording a test signal to the first standard magnetic tape; seventh means for reproducing the test signal from the first standard magnetic tape; and eighth means for detecting whether or not the first standard magnetic tape is suited to recording of the process-resultant video signal in response to a level of the reproduced test signal.

A seventh aspect of this invention is based on the sixth aspect thereof, and provides a magnetic recording apparatus wherein a recording level of the test signal is equal to a recording level of the process-resultant video signal.

An eighth aspect of this invention is based on the seventh aspect thereof, and provides a magnetic recording apparatus wherein the sixth means records the test signal at only a single recording level.

A ninth aspect of this invention is based on the seventh aspect thereof, and provides a magnetic recording apparatus wherein the sixth means records the test signal at a plurality of different recording levels, and the fourth means records the processing-resultant video signal at a recording level equal to a recording level among the plurality of the different recording levels at which a reproduction level is maximized.

A tenth aspect of this invention is based on the sixth aspect thereof, and provides a magnetic recording apparatus wherein the first means comprises a detail enhancer, a pre-emphasis circuit, a white/dark clip circuit, and a recording current equalizer, and further comprising ninth means for varying operation characteristics of at least one among the detail enhancer, the pre-emphasis circuit, the white/dark clip circuit, and the recording current equalizer in response to the level of the reproduced test signal.

An eleventh aspect of this invention provides a magnetic recording apparatus comprising first means for recording one of a first video signal of a normal-quality standard format and a second video signal of a high-quality standard format on one of a normal-quality standard tape and a high-quality standard tape; and second means for recording a third video signal on one of the normal-quality standard tape and the high-quality standard tape, the third video signal being closer in quality to the second video signal.

A twelfth aspect of this invention is based on the eleventh aspect thereof, and provides a magnetic recording apparatus further comprising third means for recording a test signal on one of the normal-quality standard tape and the high-quality standard tape; fourth means for reproducing the test signal from one of the normal-quality standard tape and the high-quality standard tape; and fifth means for selecting one of the first means and the second means in response to a level of the reproduced test signal, and for activating selected one of the first means and the second means.

A thirteenth aspect of this invention is based on the eleventh aspect thereof, and provides a magnetic recording apparatus further comprising third means for detecting whether or not a cassette containing one of the normal-quality standard tape and the high-quality standard tape has an identification hole; and fourth means for selecting one of the first means and the second means in response to a result of the detection by the third means, and for activating selected one of the first means and the second means.

A fourteenth aspect of this invention is based on the eleventh aspect thereof, and provides a magnetic recording apparatus further comprising third means for selecting one of the first means and the second means in response to user's request, and for activating selected one of the first means and the second means.

A fifteenth aspect of this invention provides an apparatus for recording video information on a VHS standard tape which comprises first means for detecting whether or not a quality of the VHS standard tape exceeds a reference quality; second means for processing an input video signal into a first processing-resultant video signal with a first given frequency band when the first means detects that the quality of the VHS standard tape exceeds the reference quality; third means for processing the input video signal into a second processing-resultant video signal with a second given frequency band when the first means detects that the quality of the VHS standard tape does not exceed the reference quality, the second given frequency band being narrower than the first given frequency band; and fourth means for recording either the first processing-resultant video signal or the second processing-resultant video signal on the VHS standard tape.

A sixteenth aspect of this invention is based on the fifteenth aspect thereof, and provides an apparatus wherein the first means comprises means for recording a predetermined test signal on the VHS standard tape; means for reproducing the test signal from the VHS standard tape; and means for detecting whether or not the quality of the VHS standard tape exceeds the reference quality in response to a level of the reproduced test signal.

BRIEF DESCRIPTION OF THE DRAWINGS

FIG. 14 is a block diagram of a magnetic recording apparatus according to a fourth embodiment of this invention.

DESCRIPTION OF THE PREFERRED EMBODIMENTS

First Embodiment

Figure 1:
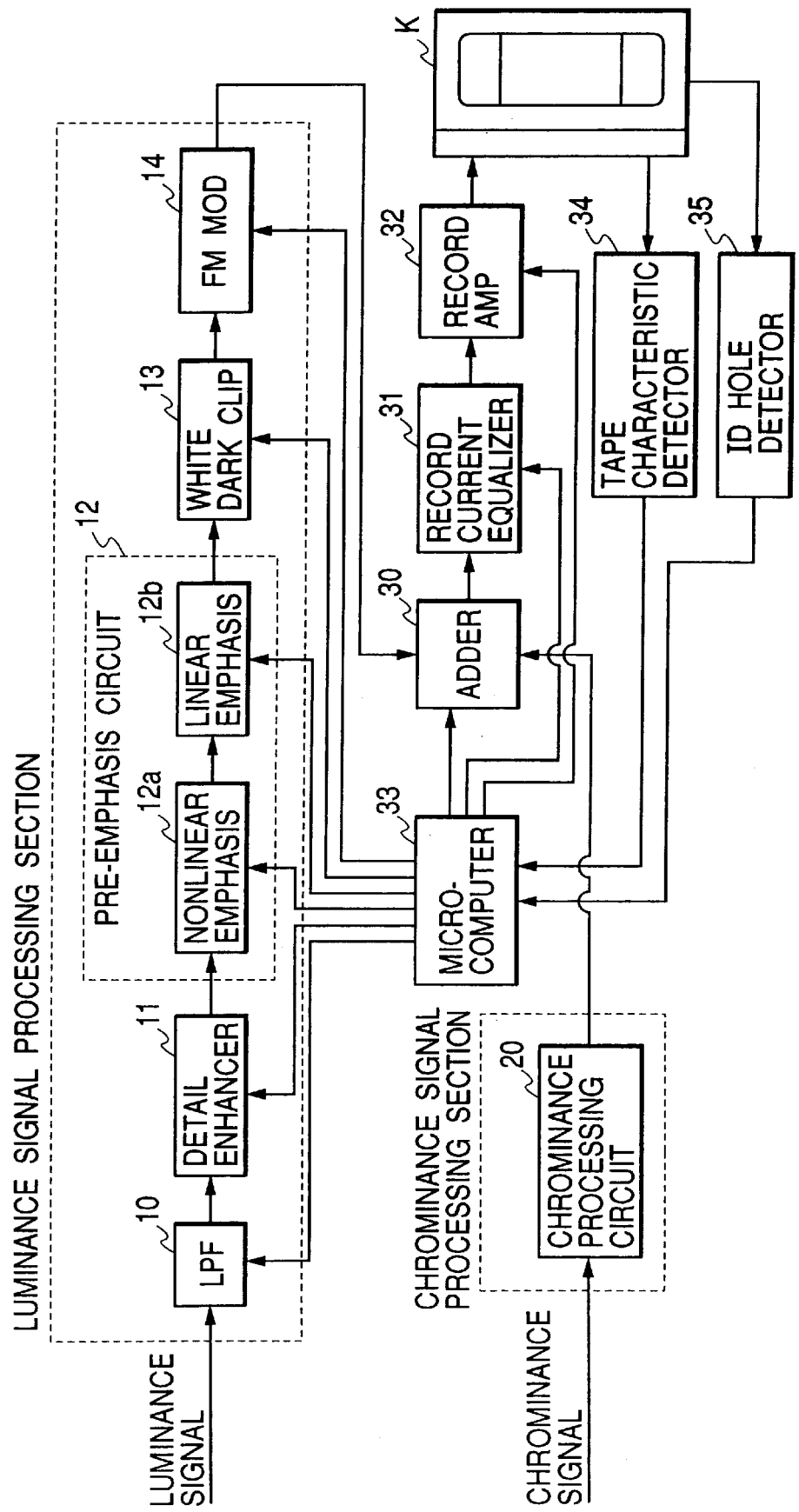
FIG. 1 is a block diagram of a magnetic recording apparatus according to a first embodiment of this invention.

FIG. 1 shows a magnetic recording apparatus according to a first embodiment of this invention. Operation of the magnetic recording apparatus of FIG. 1 can be changed among different modes including a normal-quality mode and high-quality modes. The normal-quality mode corresponds to a VHS mode. One of the high-quality modes corresponds to an S-VHS mode. The magnetic recording apparatus of FIG. 1 can use either a normal-quality magnetic tape or a high-quality magnetic tape. The normal-quality magnetic tape corresponds to a VHS tape. The high-quality magnetic tape corresponds to an S-VHS tape.

The magnetic recording apparatus of FIG. 1 is basically divided into a luminance signal processing section and a chrominance signal processing section. The luminance signal processing section converts an input luminance signal into an FM (modulated) luminance signal. The chrominance signal processing section converts input chrominance signals into frequency-down-converted chrominance signals. The FM luminance signal and the frequency-down-converted chrominance signals are combined and multiplexed into a composite video signal on a frequency division basis. The composite video signal is transmitted to magnetic heads via a recording amplifier, and is recorded on a magnetic tape by the magnetic heads.

In the magnetic recording apparatus of FIG. 1, the luminance signal processing section includes a low pass filter (LPF) 10, a detail enhancer 11, a pre-emphasis circuit 12, a white/dark clip circuit 13, and an FM modulation circuit 14 which are successively connected in that order.

The low pass filter 10 receives an input luminance signal, and removes high-frequency components from the input luminance signal. The low pass filter 10 outputs the resultant luminance signal to the detail enhancer 11. The detail enhancer 11 processes the output signal of the low pass filter 10 to compensate for signal components deleted by a noise canceller during playback. The detail enhancer 11 outputs the resultant luminance signal to the pre-emphasis circuit 12.

The pre-emphasis circuit 12 includes a nonlinear emphasis circuit 12a and a linear emphasis circuit 12b connected in series. The nonlinear emphasis circuit 12a and the linear emphasis circuit 12b emphasize high-frequency luminance components to improve an S/N ratio in luminance. Specifically, the nonlinear emphasis circuit 12a emphasizes high-frequency components of the output signal of the detail enhancer 11 to a degree depending on the level of the high-frequency components. The degree of the emphasis increases as the level of the high-frequency components decreases. The nonlinear emphasis circuit 12a outputs the resultant luminance signal to the linear emphasis circuit 12b. The linear emphasis circuit 12b emphasizes high-frequency components of the output signal of the nonlinear emphasis circuit 12a to a degree independent of the level of the high-frequency components. The linear emphasis circuit 12b outputs the resultant luminance signal to the white/dark clip circuit 13.

The white/dark clip circuit 13 removes spike components from the output signal of the pre-emphasis circuit 12 to prevent the occurrence of luminance reversal. In general, the spike components are present at rising edges and falling edges in the output signal of the pre-emphasis circuit 12. The white/dark clip circuit 13 outputs the resultant luminance signal to the FM modulation circuit 14.

The low pass filter 10, the detail enhancer 11, the pre-emphasis circuit 12, and the white/dark clip circuit 13 are connected to a microcomputer 33. The signal processing characteristics of the low pass filter 10, the detail enhancer 11, the pre-emphasis circuit 12, and the white/dark clip circuit 13 are determined by control signals fed from the microcomputer 33.

The FM modulation circuit 14 converts the output signal of the white/dark clip circuit 13 into an FM (modulated) luminance signal having a frequency deviation which can be changed between a frequency band for the VHS format and a frequency band for the S-VHS format. The FM modulation circuit 14 is connected to the microcomputer 33. The frequency deviation in the FM luminance signal is set to either the VHS type or the S-VHS type by a control signal fed from the microcomputer 33. The FM modulation circuit 14 outputs the FM luminance signal to an adder 30.

The FM modulation circuit 14 includes an oscillator (not shown) which generates a predetermined test signal having a prescribed frequency. As will be explained later, the test signal is used in detecting characteristics of a used magnetic tape.

In the magnetic recording apparatus of FIG. 1, the chrominance signal processing section includes a chrominance signal processing circuit 20. The chrominance signal processing circuit 20 receives input chrominance signals, and subjects the input chrominance signals to frequency down conversion. Thereby, the chrominance signal processing circuit 20 generates frequency-down-converted chrominance signals from the input chrominance signals. The chrominance signal processing circuit 20 outputs the frequency-down-converted chrominance signals to the adder 30.

The adder 30 combines or multiplexes the FM luminance signal and the frequency-down-converted chrominance signals into a composite video signal on a frequency division basis. The composite video signal is a record signal, that is, a signal to be recorded. The adder 30 outputs the composite video signal to a recording current equalizer 31.

The recording current equalizer 31 processes the output signal of the adder 30 to compensate for variations in frequency response characteristics of parts including magnetic heads. The recording current equalizer 31 outputs the resultant video signal to a recording amplifier 32. The recording amplifier 32 enlarges the output signal of the recording current equalizer 31 to a level suited to signal recording on a magnetic tape contained in a cassette K. The recording amplifier 32 outputs the resultant video signal. The output signal of the recording amplifier 32 is transmitted via rotary transformers to magnetic heads before being recorded on the magnetic tape in the cassette K by the magnetic heads.

The adder 30, the recording current equalizer 31, and the recording amplifier 32 are connected to the microcomputer 33. The mixing ratio between the FM luminance signal and the frequency-down-converted chrominance signals in the adder 30 is determined by a control signal fed from the microcomputer 33. Conditions of the signal processing by the recording current equalizer 31 are determined by a control signal fed from the microcomputer 33. The gain of the recording amplifier 32 is determined by a control signal fed from the microcomputer 33.

The magnetic recording apparatus of FIG. 1 includes a tape characteristic detector 34, and an identification hole detector 35. The device 34 detects the characteristics of the magnetic tape in the cassette K. The tape characteristic detector 34 outputs a signal to the microcomputer 33 which represents the detected tape characteristics. The device 35 detects whether an identification hole is present in or absent from the tape casette K. In general, a cassette containing an S-VHS tape has an identification hole. On the other hand, a cassette containing a VHS tape does not have an identification hole. Accordingly, when the device 35 detects the presence of an identification hole in the tape cassette K, it is decided that the magnetic tape in the cassette K is of the S-VHS type. On the other hand, when the device 35 detects the absence of an identification hole from the tape cassette K, it is decided that the magnetic tape in the cassette K is of the VHS type. The identification hole detector 35 outputs a signal to the microcomputer 33 which represents whether an identification hole is present in or absent from the tape casette K, that is, whether the magnetic tape in the cassette K is of the S-VHS type or the VHS type.

The microcomputer 33 includes a combination of an input/output port, a CPU, a ROM, and a RAM. The microcomputer 33 operates in accordance with a program stored in the ROM. According to a segment of the program, the microcomputer 33 selects a desired recording mode of operation of the apparatus in FIG. 1 from among a VHS recording mode, an S-VHS recording mode, a first high-quality recording mode, and a second high-quality recording mode in response to the output signals of the tape characteristic detector 34 and the identification hole detector 35. Then, the microcomputer 33 determines the characteristics of the signal processing by the low pass filter 10, the detail enhancer 11, the pre-emphasis circuit 12, the white/dark clip circuit 13, the FM modulation circuit 14, the adder 30, the recording current equalizer 31, and the recording amplifier 32 in accordance with the desired recording mode of operation. Thereby, the microcomputer 33 sets an actual recording mode of operation of the apparatus in FIG. 1 into agreement with the desired recording mode.

The magnetic recording apparatus of FIG. 1 operates as follows. When the tape cassette K is placed into the magnetic recording apparatus, the device 35 detects whether an identification hole is present in or absent from the tape casette K. In the presence of an identification hole, the device 35 decides that the magnetic tape in the cassette K is of the S-VHS type. In the absence of an identification hole, the device 35 decides that the magnetic tape in the cassette K is of the VHS type. The identification hole detector 35 informs the microcomputer 33 of whether the magnetic tape in the cassette K is of the VHS type or the S-VHS type.

In the case where the magnetic tape in the cassette K is decided to be of the VHS type, the microcomputer 33 starts a testing process to decide whether or not the characteristics of the magnetic tape are sufficient for the recording of a video signal of the S-VHS format or the recording of a video signal having a picture quality higher than that of a VHS-format video signal.

During the testing process, the microcomputer 33 activates the oscillator in the FM modulation circuit 14 so that the oscillator generates a predetermined test signal. The test signal is transmitted from the FM modulation circuit 14 to the recording amplifier 32 via the adder 30 and the recording current equalizer 31. The microcomputer 33 controls the recording amplifier 32 so that the test signal is amplified thereby to a level significantly lower than the normal level of an amplified S-VHS video signal. The recording amplifier 32 feeds the resultant test signal to the magnetic heads via the rotary transformers. The magnetic heads record the test signal on the magnetic tape in the cassette K. Then, the test signal is reproduced from the magnetic tape in the cassette K by a magnetic reproducing device of, for example, a conventional type. The reproduced test signal is fed to the tape characteristic detector 34. The tape characteristic detector 34 may contain the magnetic reproducing device. The tape characteristic detector 34 includes a level detector for deciding which of three predetermined different levels the level of the reproduced test signal corresponds to. The three predetermined different levels are referred to as the lowest level "1", the intermediate level "2", and the highest level "3" respectively. The tape characteristic detector 34 informs the microcomputer 33 of the level decision result.

Specifically, the tape characteristic detector 34 compares the level of the reproduced test signal with a lower reference level and a higher reference level. When the level of the reproduced test signal is smaller than the lower reference level, the tape characteristic detector 34 decides that the level of the reproduced test signal corresponds to the lowest level "1". When the level of the reproduced test signal is between the lower reference level and the higher reference level, the tape characteristic detector 34 decides that the level of the reproduced test signal corresponds to the intermediate level "2". When the level of the reproduced test signal is greater than the higher reference level, the tape characteristic detector 34 decides that the level of the reproduced test signal corresponds to the highest level "3".

In other words, the tape characteristic detector 34 decides whether the quality of the magnetic tape in the cassette K is in a low range, an intermediate range, or a high range. The previously-indicated lower reference level corresponds to the boundary between the low quality range and the intermediate quality range. The previously-indicated higher reference level corresponds to the boundary between the intermediate quality range and the high quality range. When the level of the reproduced test signal corresponds to the lowest level "1", the tape characteristic detector 34 decides that the quality of the magnetic tape in the cassette K is in the low range. When the level of the reproduced test signal corresponds to the intermediate level "2", the tape characteristic detector 34 decides that the quality of the magnetic tape in the cassette K is in the intermediate range. When the level of the reproduced test signal corresponds to the highest level "3", the tape characteristic detector 34 decides that the quality of the magnetic tape in the cassette K is in the high range.

The microcomputer 33 responds to the result of the decision by the tape characteristic detector 34 as follows. When it is decided that the level of the reproduced test signal corresponds to the lowest level "1", the microcomputer 33 sets operation of the apparatus of FIG. 1 to a VHS recording mode. When it is decided that the level of the reproduced test signal corresponds to the intermediate level "2", the microcomputer 33 sets operation of the apparatus of FIG. 1 to a first high-quality recording mode. When it is decided that the level of the reproduced test signal corresponds to the highest level "3", the microcomputer 33 sets operation of the apparatus of FIG. 1 to a second high-quality recording mode.

On the other hand, in the case where the magnetic tape in the cassette K is decided to be of the S-VHS type, the microcomputer 33 sets operation of the apparatus of FIG. 1 to an S-VHS recording mode.

During the first high-quality recording mode of operation, the microcomputer 33 sets the cutoff frequency of the low pass filter 10 to 5 MHz. In addition, the microcomputer 33 sets the characteristics of the signal processing by the detail enhancer 11, the pre-emphasis circuit 12, the white/dark clip circuit 13, and the recording current equalizer 31 into line with the recording of a high-quality video signal on a VHS tape corresponding to the intermediate level "2". Furthermore, the microcomputer 33 adjusts the signal mixing ratio in the adder 30 in response to the signal recording level determined by the recording amplifier 32. Also, the microcomputer 33 controls the FM modulation circuit 14 to provide a frequency deviation of 5.4 to 7.0 MHz.

During the second high-quality recording mode of operation, the microcomputer 33 sets the cutoff frequency of the low pass filter 10 to 5 MHz. In addition, the microcomputer 33 sets the characteristics of the signal processing by at least one member of the detail enhancer 11, the pre-emphasis circuit 12, the white/dark clip circuit 13, and the recording current equalizer 31 into line with the recording of a high-quality video signal on a VHS tape corresponding to the highest level "3". Furthermore, the microcomputer 33 adjusts the signal mixing ratio in the adder 30 in response to the signal recording level determined by the recording amplifier 32. Also, the microcomputer 33 controls the FM modulation circuit 14 to provide a frequency deviation of 5.4 to 7.0 MHz.

During the VHS recording mode of operation, the microcomputer 33 sets the cutoff frequency of the low pass filter 10 to 3 MHz. In addition, the microcomputer 33 sets the characteristics of the signal processing by the detail enhancer 11, the pre-emphasis circuit 12, the white/dark clip circuit 13, the adder 30, the recording current equalizer 31, and the recording amplifier 32 into line with the recording of a VHS video signal on a VHS tape. Furthermore, the microcomputer 33 controls the FM modulation circuit 14 to provide a frequency deviation of 3.4 to 4.4 MHz.

During the S-VHS recording mode of operation, the microcomputer 33 sets the cutoff frequency of the low pass filter 10 to 5 MHz. In addition, the microcomputer 33 sets the characteristics of the signal processing by the detail enhancer 11, the pre-emphasis circuit 12, the white/dark clip circuit 13, the adder 30, the recording current equalizer 31, and the recording amplifier 32 into line with the recording of an S-VHS video signal on an S-VHS tape. Furthermore, the microcomputer 33 controls the FM modulation circuit 14 to provide a frequency deviation of 5.4 to 7.0 MHz.

As understood from the previous explanation, the apparatus of FIG. 1 records a high-quality video signal on a VHS tape corresponding to the intermediate level "2" or the highest level "3". The high-quality video signal can be reproduced from the VHS tape by a VTR of the S-VHS standard.

The first high-quality recording mode of operation and the second high-quality recording mode of operation will be further explained. During the first or second high-quality recording mode of operation, the detail enhancer 11 and the pre-emphasis circuit 12 amplify high-frequency components of the input luminance signal at a degree which is lower than that used during the S-VHS recording mode.

Figure 2:
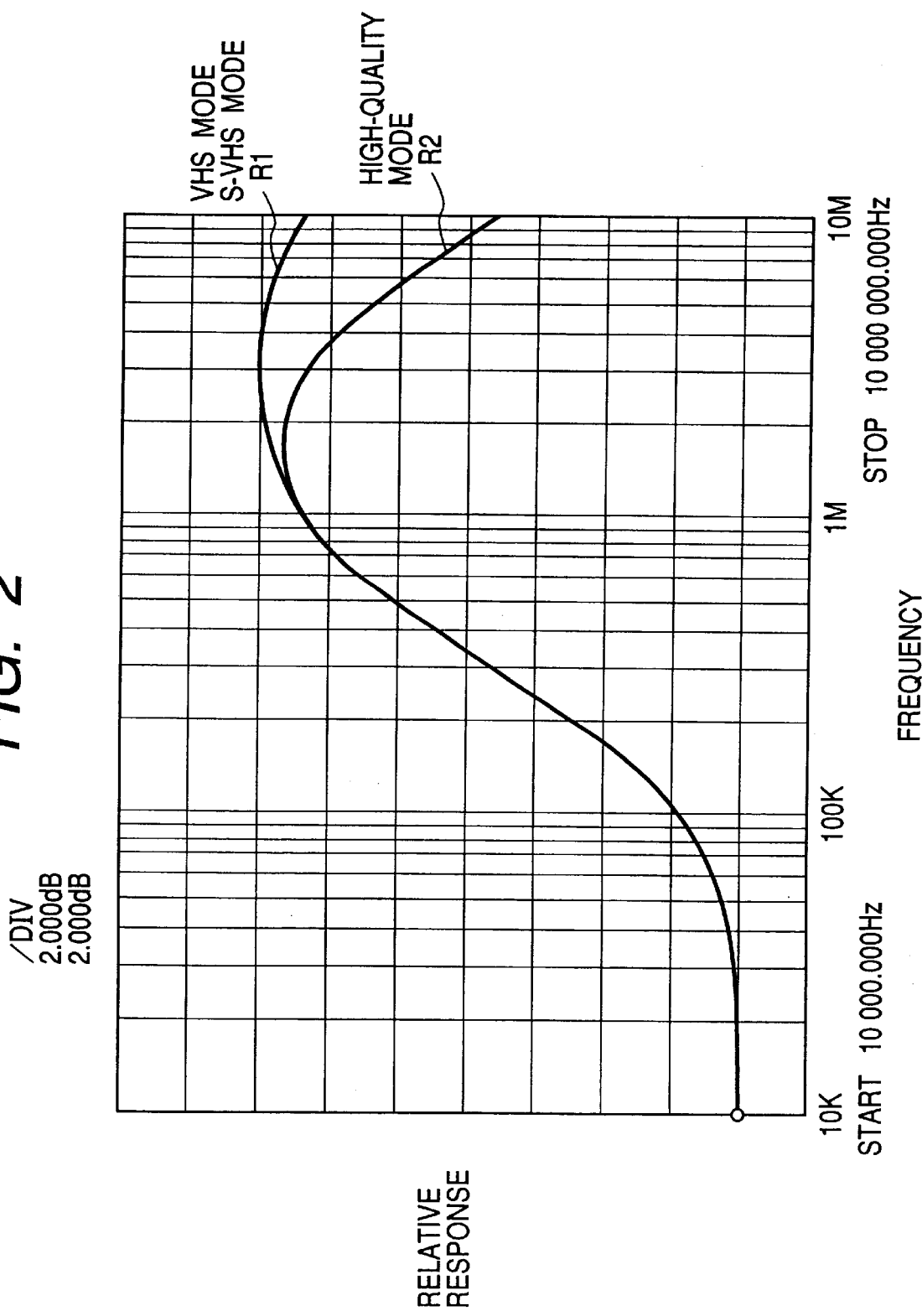
FIG. 2 is a diagram of the changeable frequency response of a linear emphasis circuit in the apparatus of FIG. 1.

The frequency response of the linear emphasis circuit 12b can be changed between a first type R1 and a second type R2 shown in FIG. 2. The first type R1 is selected during the VHS recording mode of operation and the S-VHS recording mode of operation. The second type R2 is selected during the first high-quality recording mode of operation and the second high-quality recording mode of operation. As shown in FIG. 2, the second type R2 causes less amplification of high-frequency signal components in comparison with the first type R1.

Figure 3:
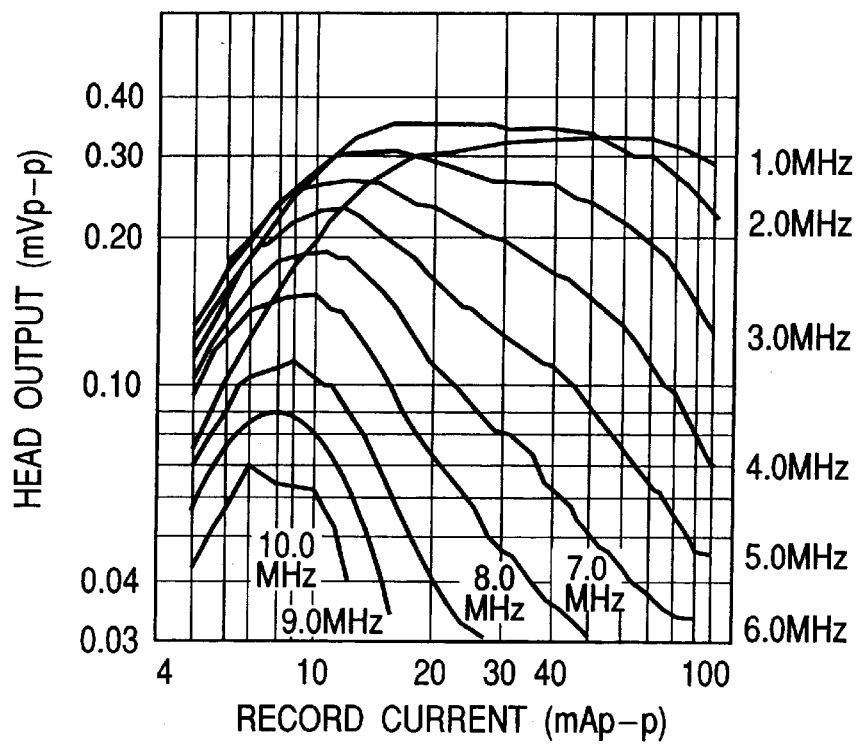
FIG. 3 is a diagram of the electromagnetic conversion frequency response of a VHS tape.
Figure 4:
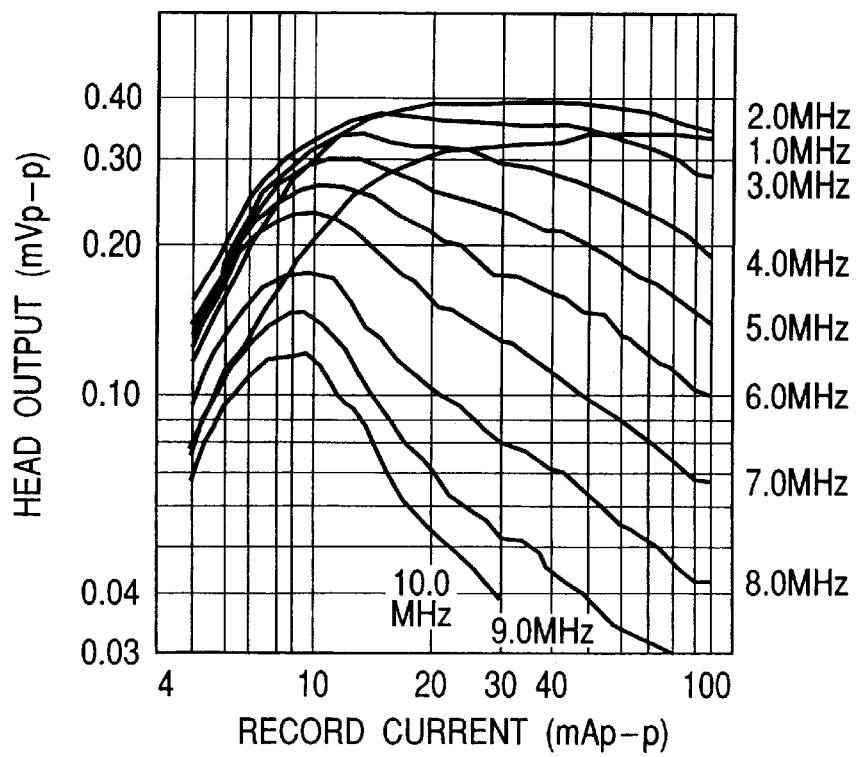
FIG. 4 is a diagram of the electromagnetic conversion frequency response of an S-VHS tape.

During the first or second high-quality recording mode of operation, the white clip level in the white/dark clip circuit 13 is set to 190%±10%. On the other hand, during the S-VHS recording mode of operation, the white clip level in the white/dark clip circuit 13 is set to 210%±10%. This change of the white clip level is implemented in view of the following fact. As shown in FIGS. 3 and 4, a VHS tape causes greater attenuation of high-frequency components of a reproduced signal in comparison with an S-VHS tape. The reduced white clip level during the first or second high-quality recording mode of operation suppresses the shortest recording wavelength, and prevents the occurrence of luminance reversal.

During the first or second high-quality recording mode of operation, and the S-VHS recording mode of operation, the dark clip level in the white/dark clip circuit 13 is set to −70%±10%.

During the first or second high-quality recording mode of operation, the FM modulation circuit 14 provides a frequency deviation of 5.4 to 7.0 MHz in the FM luminance signal. This frequency deviation is the same as that provided during the S-VHS recording mode of operation. Therefore, the recorded signal frequency allocation provided during the first or second high-quality recording mode of operation is the same as that provided during the S-VHS recording mode of operation.

The adder 30 is controlled by the microcomputer 33 so that the mixing ratio between the FM luminance signal and the frequency-down-converted chrominance signals varies in response to whether the magnetic tape in the cassette K corresponds to the lowest level "1", the intermediate level "2", or the highest level "3", that is, whether the apparatus of FIG. 1 operates in the VHS recording mode, the first high-quality recording mode, or the second high-quality recording mode. Specifically, during the first or second high-quality recording mode of operation, the signal mixing ratio in the adder 30 is set to a level such that a signal distortion caused by cross modulation and occurring upon recording onto a magnetic tape will be in the allowable range prescribed by the S-VHS standard.

The recording current equalizer 31 is controlled by the microcomputer 33 to compensate for the difference in electromagnetic conversion frequency response between an S-VHS tape and a VHS tape. Specifically, during the first or second high-quality recording mode of operation, the recording current equalizer 31 provides greater suppression of low-frequency signal components than that prescribed by the S-VHS standard.

Figure 5:
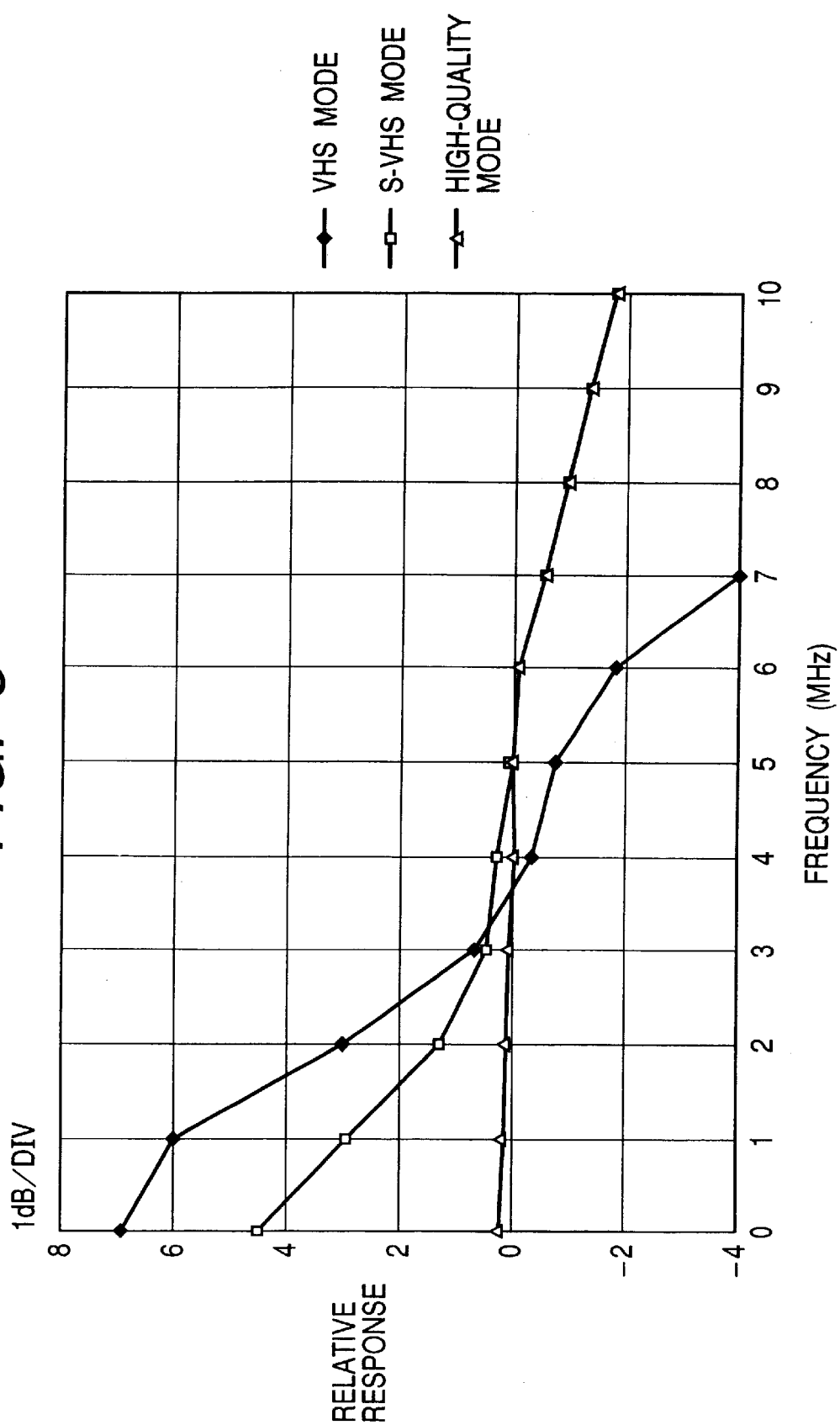
FIG. 5 is a diagram of the changeable frequency response of a recording current equalizer in the apparatus of FIG. 1.

As shown in FIG. 5, the frequency response of the recording current equalizer 31 can be changed among first, second, and third types. The frequency response of the recording current equalizer 31 is set to the first type during the VHS recording mode of operation. The frequency response of the recording current equalizer 31 is set to the second type during the S-VHS recording mode of operation. The frequency response of the recording current equalizer 31 is set to the third type during the first or second high-quality recording mode of operation. The frequency response of the third type (the high-quality type) provides less suppression of high-frequency signal components than that provided by the frequency response of the first type (the VHS type).

During the first or second high-quality recording mode of operation, the recording amplifier 32 is controlled by the microcomputer 33 so as to amplify the output signal of the recording current equalizer 31 to a level significantly lower than the normal level of an amplified S-VHS video signal. The recording amplifier 32 feeds the amplification-resultant video signal to the magnetic heads via the rotary transformers. The magnetic heads record the video signal on the magnetic tape in the cassette K. In this way, during the first or second high-quality recording mode of operation, the apparatus of FIG. 1 records a high-quality video signal on the VHS tape corresponding to the intermediate level "2" or the highest level "3". The high-quality video signal can be reproduced from the VHS tape by a VTR of the S-VHS standard.

The characteristics of the signal processing by the detail enhancer 11, the pre-emphasis circuit 12, the white/dark clip circuit 13, and the recording current equalizer 31 are changed by the microcomputer 33 in response to the result of the decision regarding whether the magnetic tape in the cassette K corresponds to the intermediate level "2" or the highest level "3", that is, whether the apparatus of FIG. 1 operates in the first high-quality recording mode or the second high-quality recording mode. For example, in the case where the magnetic tape in the cassette K corresponds to the intermediate level "2", that is, in the case where the apparatus of FIG. 1 operates in the first high-quality recording mode, the characteristics of the signal processing by all the detail enhancer 11, the pre-emphasis circuit 12, the white/dark clip circuit 13, and the recording current equalizer 31 are set to those suited to record a high-quality video signal on a VHS tape corresponding to the intermediate level "2". On the other hand, in the case where the magnetic tape in the cassette K corresponds to the highest level "3", that is, in the case where the apparatus of FIG. 1 operates in the second high-quality recording mode, the characteristics of the signal processing by only a predetermined member or members of the detail enhancer 11, the pre-emphasis circuit 12, the white/dark clip circuit 13, and the recording current equalizer 31 are set to those suited to record a high-quality video signal on a VHS tape corresponding to the highest level "3".

During the testing process, the microcomputer 33 may control the recording amplifier 32 so that the recording level of the test signal will be changed among different levels. In this case, the lowest level "1", the intermediate level "2", and the highest level "3" may be set according to the recording level at which the level of the reproduced test signal can be maximized.

The gain of the recording amplifier 32 may be set so as to maximize the level of the reproduced test signal. The characteristics of the signal processing by the recording current equalizer 31 may be varied in accordance with the recording signal level determined by the recording amplifier 32.

The test signal generated by the oscillator in the FM modulation circuit 14 may have different-frequency components such as 2-MHz components and 6-MHz components. In this case, the characteristics of the signal processing by the detail enhancer 11, the pre-emphasis circuit 12, the white/dark clip circuit 13, and the recording current equalizer 31 may be varied in accordance with the levels of the different frequency components of the reproduced test signal.

Four or more predetermined different levels may be set for the decision regarding the level of the reproduced test signal. In this case, the characteristics of the signal processing by the detail enhancer 11, the pre-emphasis circuit 12, the white/dark clip circuit 13, and the recording current equalizer 31 can be more finely varied in response to the level of the reproduced test signal.

The recording current equalizer 31 may be located between the FM modulation circuit 14 and the adder 30.

The recording levels of other information signals such as a control pulse signal, a linear audio signal, and an FM audio signal, and the characteristics of the processing thereof can be optimized in response to the result of the decision regarding the type of the magnetic tape in the cassette K.

Second Embodiment

Figure 6:
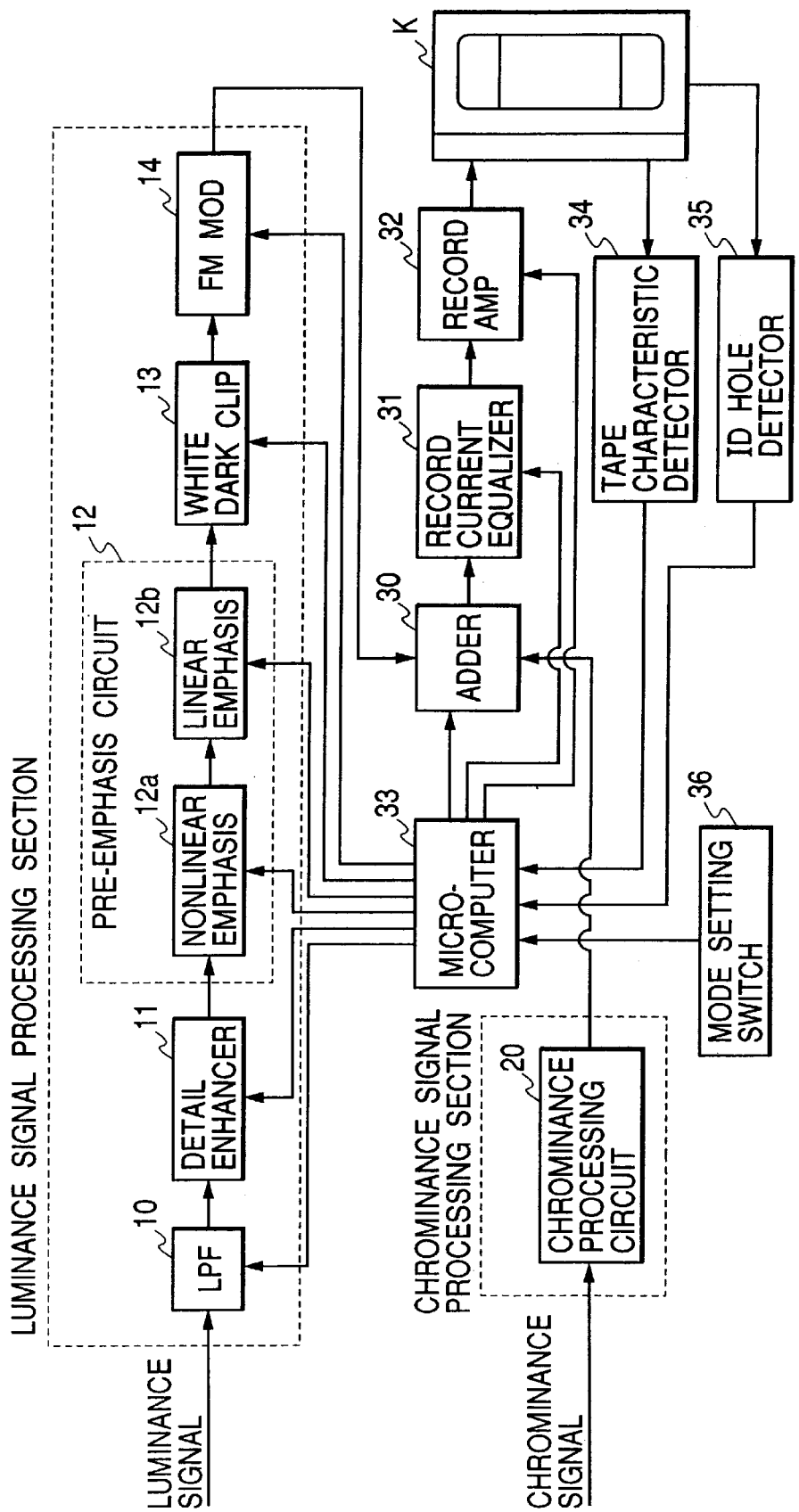
FIG. 6 is a block diagram of a magnetic recording apparatus according to a second embodiment of this invention.

FIG. 6 shows a magnetic recording apparatus according to a second embodiment of this invention. The magnetic recording apparatus of FIG. 6 is similar to the magnetic recording apparatus of FIG. 1 except that a recording-mode setting switch 36 is additionally provided.

The recording-mode setting switch 36 is connected to the microcomputer 33. The recording-mode setting switch 36 can be operated by a user. The recording-mode setting switch 36 can be changed among an OFF position, a VHS position, an S-VHS position, a first high-quality position, and a second-high quality position. The recording-mode setting switch 36 outputs a signal to the microcomputer 33 which represents the current position thereof.

When the recording-mode setting switch 36 is in its VHS position, the microcomputer 33 operates the apparatus of FIG. 6 in the VHS recording mode regardless of whether the magnetic tape in the cassette K is of the VHS type or the S-VHS type. When the recording-mode setting switch 36 is in its S-VHS position, the microcomputer 33 operates the apparatus of FIG. 6 in the S-VHS recording mode regardless of whether the magnetic tape in the cassette K is of the VHS type or the S-VHS type. When the recording-mode setting switch 36 is in its first high-quality position, the microcomputer 33 operates the apparatus of FIG. 6 in the first high-quality recording mode regardless of whether the magnetic tape in the cassette K is of the VHS type or the S-VHS type. When the recording-mode setting switch 36 is in its second high-quality position, the microcomputer 33 operates the apparatus of FIG. 6 in the second high-quality recording mode regardless of whether the magnetic tape in the cassette K is of the VHS type or the S-VHS type.

When the recording-mode setting switch 36 is in its OFF position, the microcomputer 33 sets the recording mode of operation of the apparatus of FIG. 6 in response to the output signals of the tape characteristic detector 34 and the identification hole detector 35 as in the apparatus of FIG. 1.

The tape characteristic detector 34 may be omitted from the magnetic recording apparatus of FIG. 6.

Third Embodiment

Figure 7:
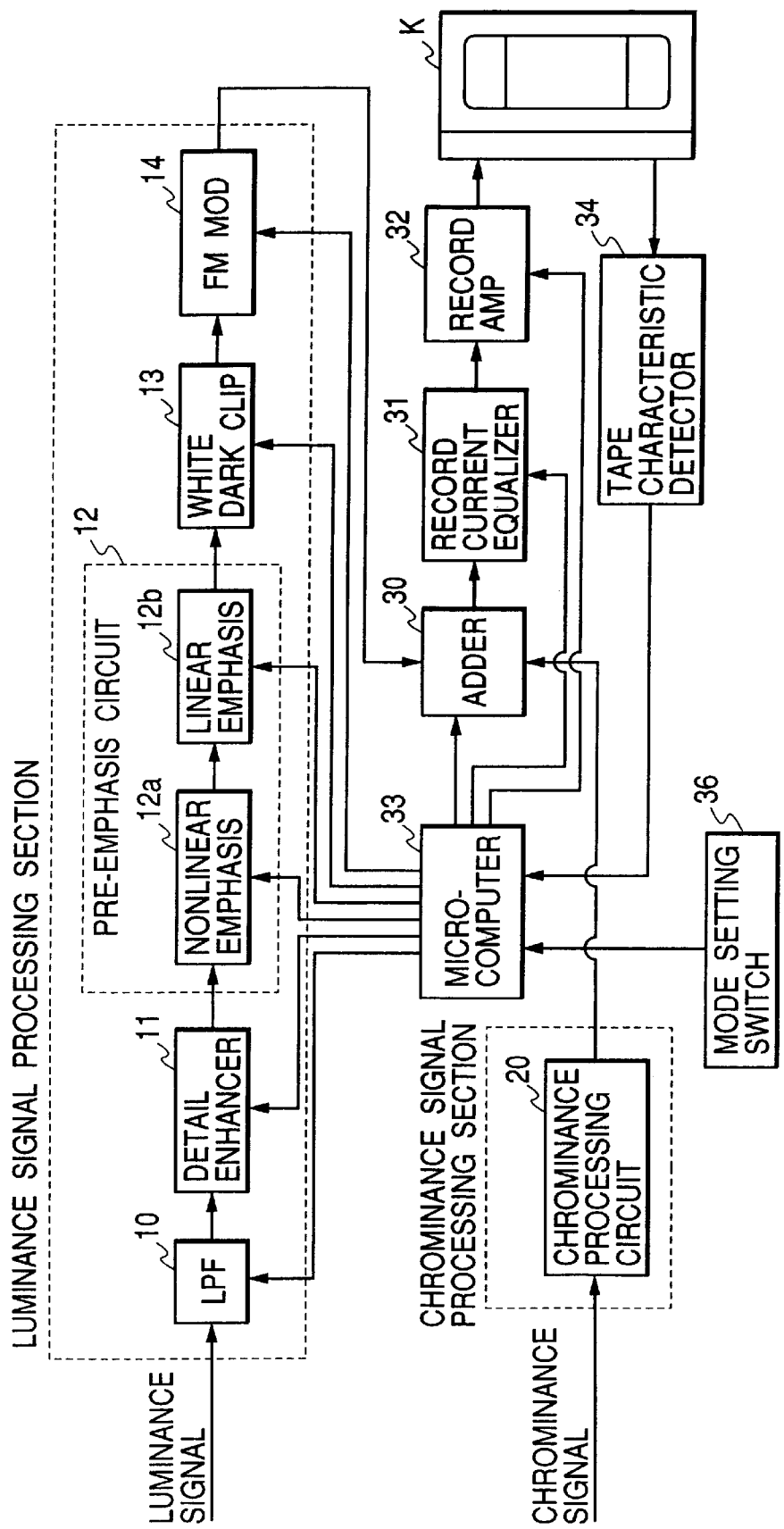
FIG. 7 is a block diagram of a magnetic recording apparatus according to a third embodiment of this invention.

FIG. 7 shows a magnetic recording apparatus according to a third embodiment of this invention. The magnetic recording apparatus of FIG. 7 is similar to the magnetic recording apparatus of FIG. 1 except for design changes indicated later.

The magnetic recording apparatus of FIG. 7 includes a recording-mode setting switch 36. On the other hand, the identification hole detector 35 (see FIG. 1) is omitted from the apparatus of FIG. 7.

The recording-mode setting switch 36 is connected to the microcomputer 33. The recording-mode setting switch 36 can be operated by a user. The recording-mode setting switch 36 can be changed among an OFF position, a VHS position, and a high-quality position. The recording-mode setting switch 36 outputs a signal to the microcomputer 33 which represents the current position thereof.

In the case where the recording-mode setting switch 36 is in its OFF position, the magnetic recording apparatus of FIG. 7 operates as follows. When a tape cassette K is placed into the magnetic recording apparatus, the microcomputer 33 starts a testing process in response to a cassette loaded signal generated by a suitable device (not shown). The testing process is designed to decide whether or not the characteristics of the magnetic tape in the cassette K are sufficient for the recording of a high-quality video signal.

During the testing process, the microcomputer 33 activates the oscillator in the FM modulation circuit 14 so that the oscillator generates a predetermined test signal. The test signal is transmitted from the FM modulation circuit 14 to the recording amplifier 32 via the adder 30 and the recording current equalizer 31. The microcomputer 33 controls the recording amplifier 32 so that the test signal is amplified thereby to a given level. The recording amplifier 32 feeds the resultant test signal to the magnetic heads via the rotary transformers. The magnetic heads record the test signal on the magnetic tape in the cassette K. Then, the test signal is reproduced from the magnetic tape in the cassette K by a magnetic reproducing device of, for example, a conventional type. The reproduced test signal is fed to the tape characteristic detector 34. The tape characteristic detector 34 may contain the magnetic reproducing device. The tape characteristic detector 34 includes a level detector for deciding whether or not the level of the reproduced test signal is less than a predetermined reference level, that is, deciding whether the quality of the magnetic tape in the cassette K is less than a predetermined reference quality. The tape characteristic detector 34 informs the microcomputer 33 of the level decision result (the tape-quality decision result). The level decision by the tape characteristic detector 34 is implemented regardless of whether the magnetic tape in the cassette K is of the VHS type or the S-VHS type.

When it is decided that the level of the reproduced test signal is less than the predetermined reference level, that is, when it is decided that the quality of the magnetic tape in the cassette K is less than the predetermined reference quality, the microcomputer 33 sets operation of the apparatus of FIG. 7 to a VHS recording mode. When it is decided that the level of the reproduced test signal is equal to or greater than the predetermined reference level, that is, when it is decided that the quality of the magnetic tape in the cassette K is equal to or greater than the predetermined reference quality, the microcomputer 33 sets operation of the apparatus of FIG. 7 to a high-quality recording mode.

During the high-quality recording mode of operation, the microcomputer 33 sets the cutoff frequency of the low pass filter 10 to a frequency in the range of 3 to 5 MHz. In addition, the microcomputer 33 sets the characteristics of the signal processing by the detail enhancer 11, the pre-emphasis circuit 12, the white/dark clip circuit 13, the adder 30, the recording current equalizer 31, and the recording amplifier 32 into line with the recording of a high-quality video signal on a high-quality tape which is similar or equal to the recording of an S-VHS video signal on an S-VHS tape. Furthermore, the microcomputer 33 controls the FM modulation circuit 14 to provide a frequency deviation of 5.4 to 7.0 MHz.

During the VHS recording mode of operation, the microcomputer 33 sets the cutoff -frequency of the low pass filter 10 to 3 MHz. In addition, the microcomputer 33 sets the characteristics of the signal processing by the detail enhancer 11, the pre-emphasis circuit 12, the white/dark clip circuit 13, the adder 30, the recording current equalizer 31, and the recording amplifier 32 into line with the recording of a VHS video signal on a VHS tape. Furthermore, the microcomputer 33 controls the FM modulation circuit 14 to provide a frequency deviation of 3.4 to 4.4 MHz.

As understood from the previous explanation, the apparatus of FIG. 7 records a high-quality video signal on a VHS tape having a relatively high quality. The high-quality video signal can be reproduced from the VHS tape by a VTR of the S-VHS standard.

The high-quality recording mode of operation will be further explained. During the high-quality recording mode of operation, the detail enhancer 11 and the pre-emphasis circuit 12 amplify high-frequency components of the input luminance signal at a degree which is greater than that used during the VHS recording mode.

Figure 8:
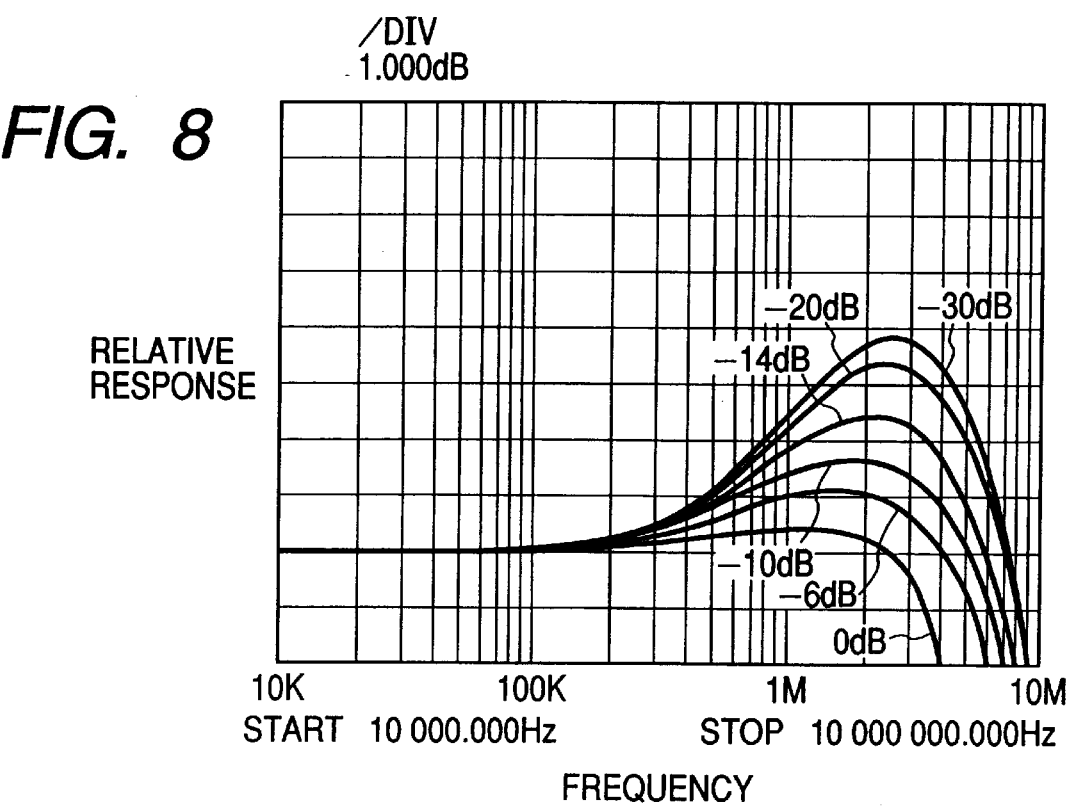
FIG. 8 is a diagram of the frequency response of a detail enhancer in the apparatus of FIG. 7 which occurs during a VHS recording mode of operation of the apparatus of FIG. 7.
Figure 9:
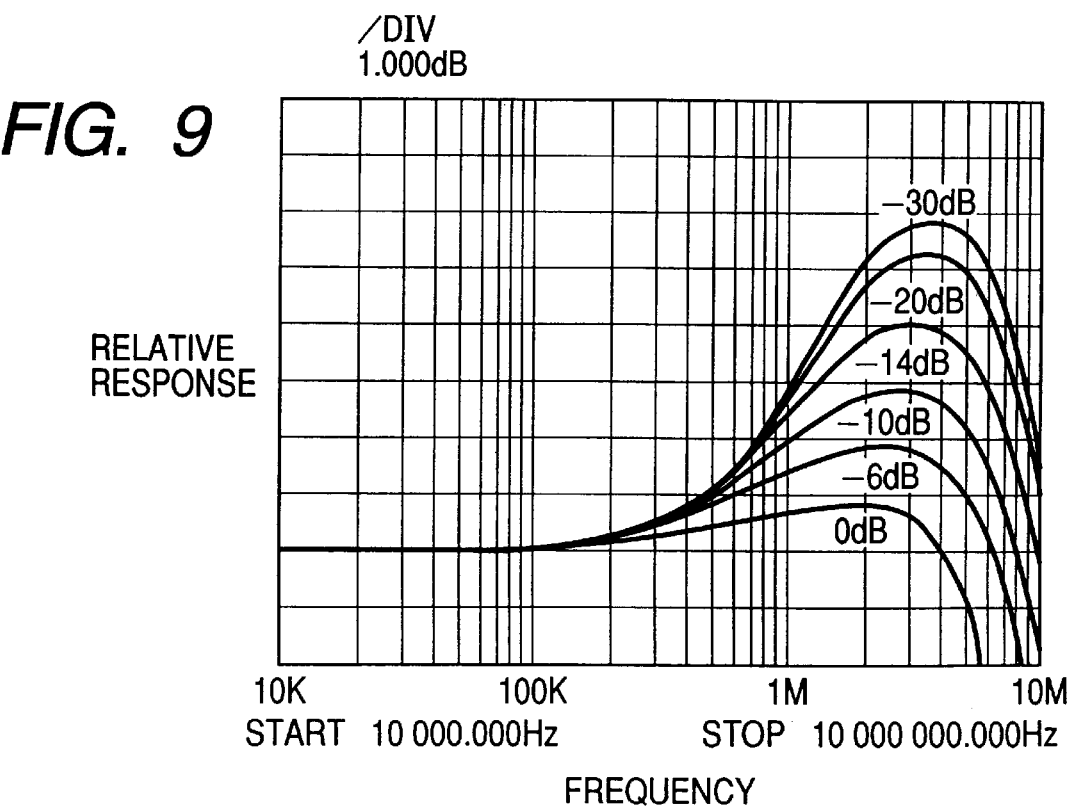
FIG. 9 is a diagram of the frequency response of the detail enhancer in the apparatus of FIG. 7 which occurs during a high-quality recording mode of operation of the apparatus of FIG. 7.
Figure 10:
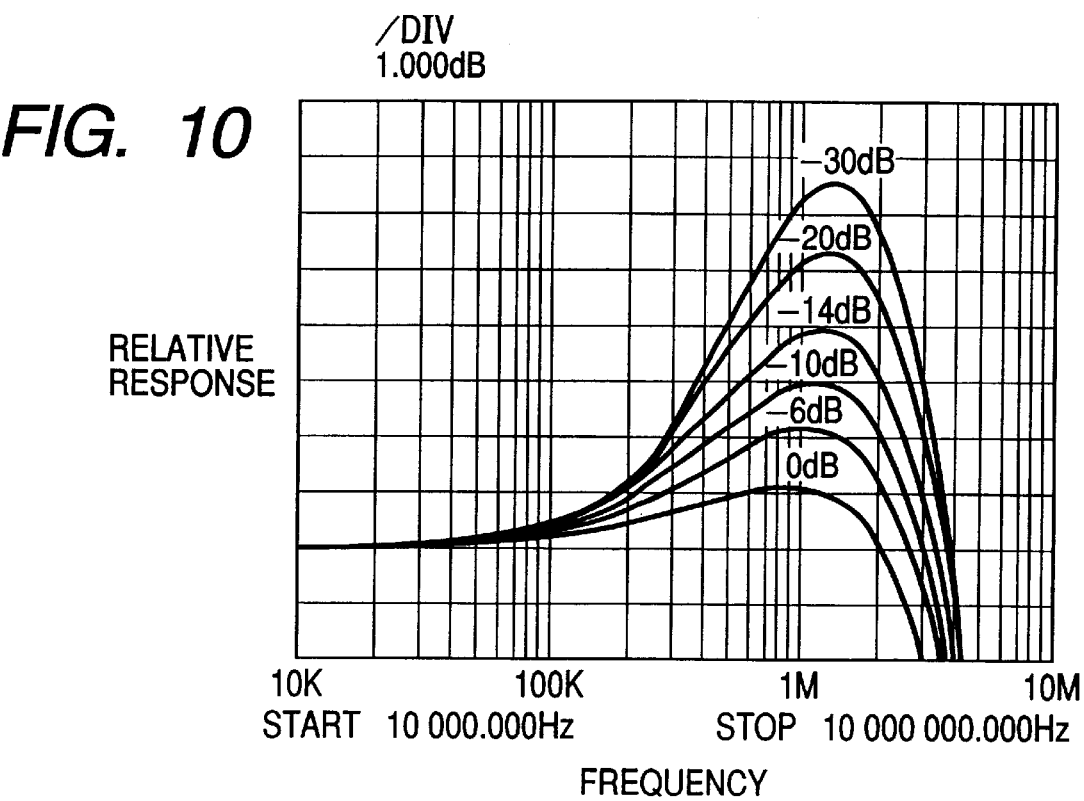
FIG. 10 is a diagram of the frequency response of a nonlinear emphasis circuit in the apparatus of FIG. 7 which occurs during the VHS recording mode of operation of the apparatus of FIG. 7.
Figure 11:
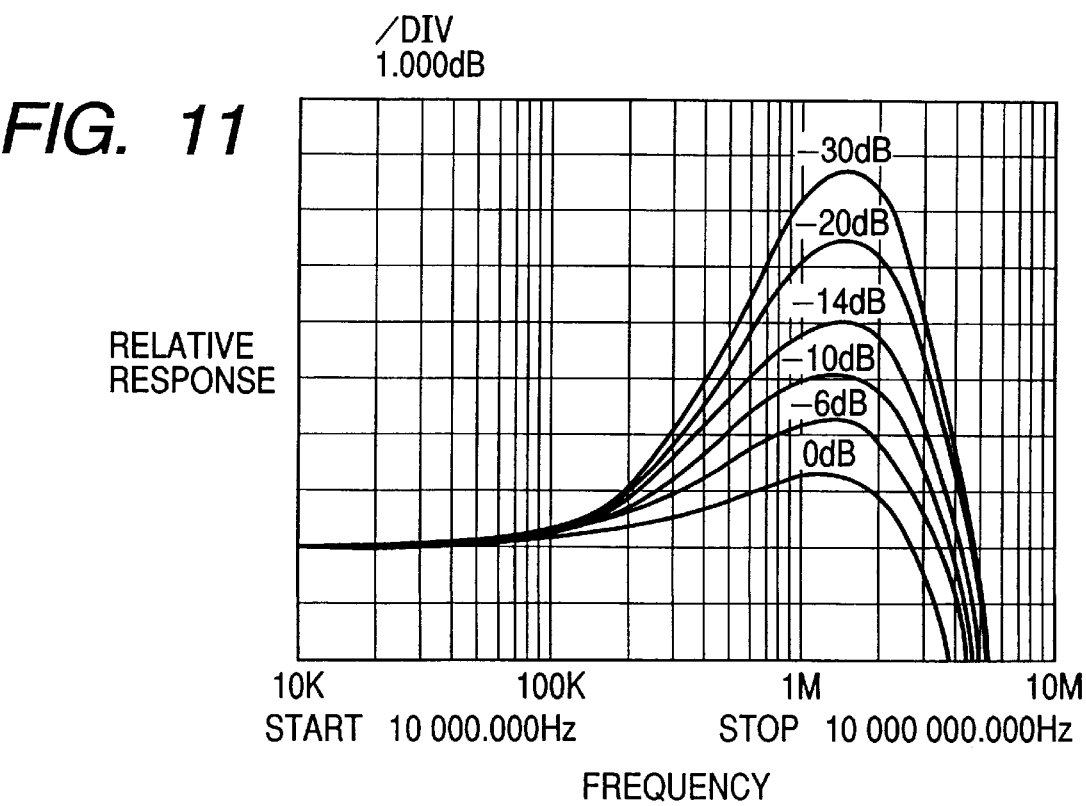
FIG. 11 is a diagram of the frequency response of the nonlinear emphasis circuit in the apparatus of FIG. 7 which occurs during the high-quality recording mode of operation of the apparatus of FIG. 7.

FIG. 8 shows an example of the frequency response of the detail enhancer 11 which is used during the VHS recording mode of operation of the apparatus of FIG. 7. FIG. 9 shows an example of the frequency response of the detail enhancer 11 which is used during the high-quality recording mode of operation of the apparatus of FIG. 7. FIG. 10 shows an example of the frequency response of the nonlinear emphasis circuit 12a which is used during the VHS recording mode of operation of the apparatus of FIG. 7. FIG. 11 shows an example of the frequency response of the nonlinear emphasis circuit 12a which is used during the high-quality recording mode of operation of the apparatus of FIG. 7.

Figure 12:
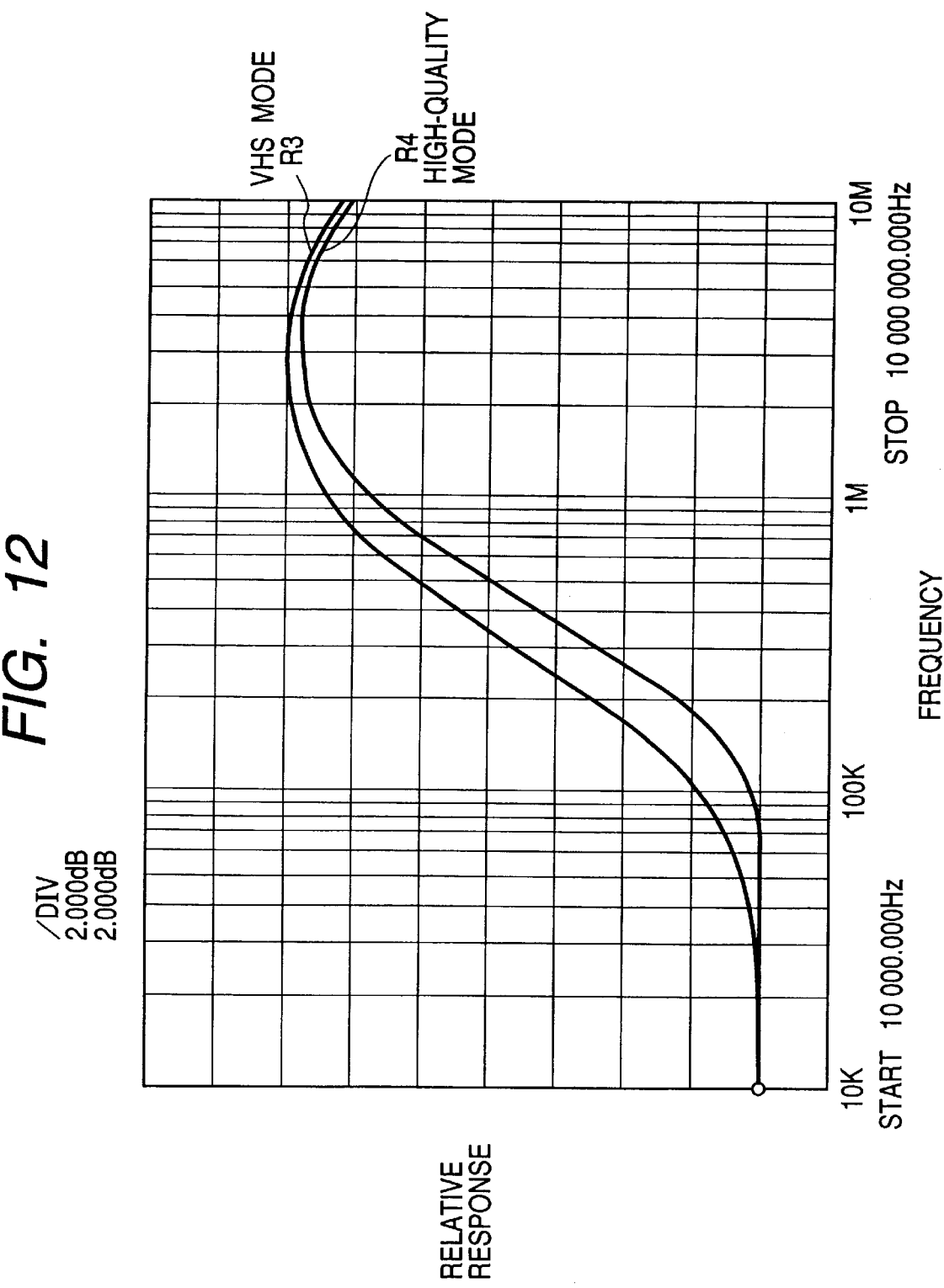
FIG. 12 is a diagram of the changeable frequency response of a linear emphasis circuit in the apparatus of FIG. 7.

The frequency response of the linear emphasis circuit 12b can be changed between a first type R3 and a second type R4 shown in FIG. 12. The first type R3 is selected during the VHS recording mode of operation. The second type R4 is selected during the high-quality recording mode of operation. As shown in FIG. 12, the second type R4 causes less amplification of high-frequency signal components in comparison with the first type R3.

During the VHS recording mode of operation, the white clip level in the white/dark clip circuit 13 is set to 170%±10%. On the other hand, during the high-quality recording mode of operation, the white clip level in the white/dark clip circuit 13 is set to 190%±10% so that the shortest recording wavelength is reduced. In this case, the dark clip level in the white/dark clip circuit 13 is set to −70%±10%.

During the high-quality recording mode of operation, the FM modulation circuit 14 provides a frequency deviation of 5.4 to 7.0 MHz in the FM luminance signal. This frequency deviation is the same as that prescribed by the S-VHS standard. Therefore, the recorded signal frequency allocation provided during the high-quality recording mode of operation is the same as that prescribed by the S-VHS standard.

The adder 30 is controlled by the microcomputer 33 so that the mixing ratio between the FM luminance signal and the frequency-down-converted chrominance signals depends on whether the apparatus of FIG. 7 operates in the VHS recording mode or the high-quality recording mode. Specifically, during the high-quality recording mode of operation, the signal mixing ratio in the adder 30 is set to a level such that a signal distortion caused by cross modulation and occurring upon signal recording onto a magnetic tape will be in the allowable range prescribed by the S-VHS standard.

Figure 13:
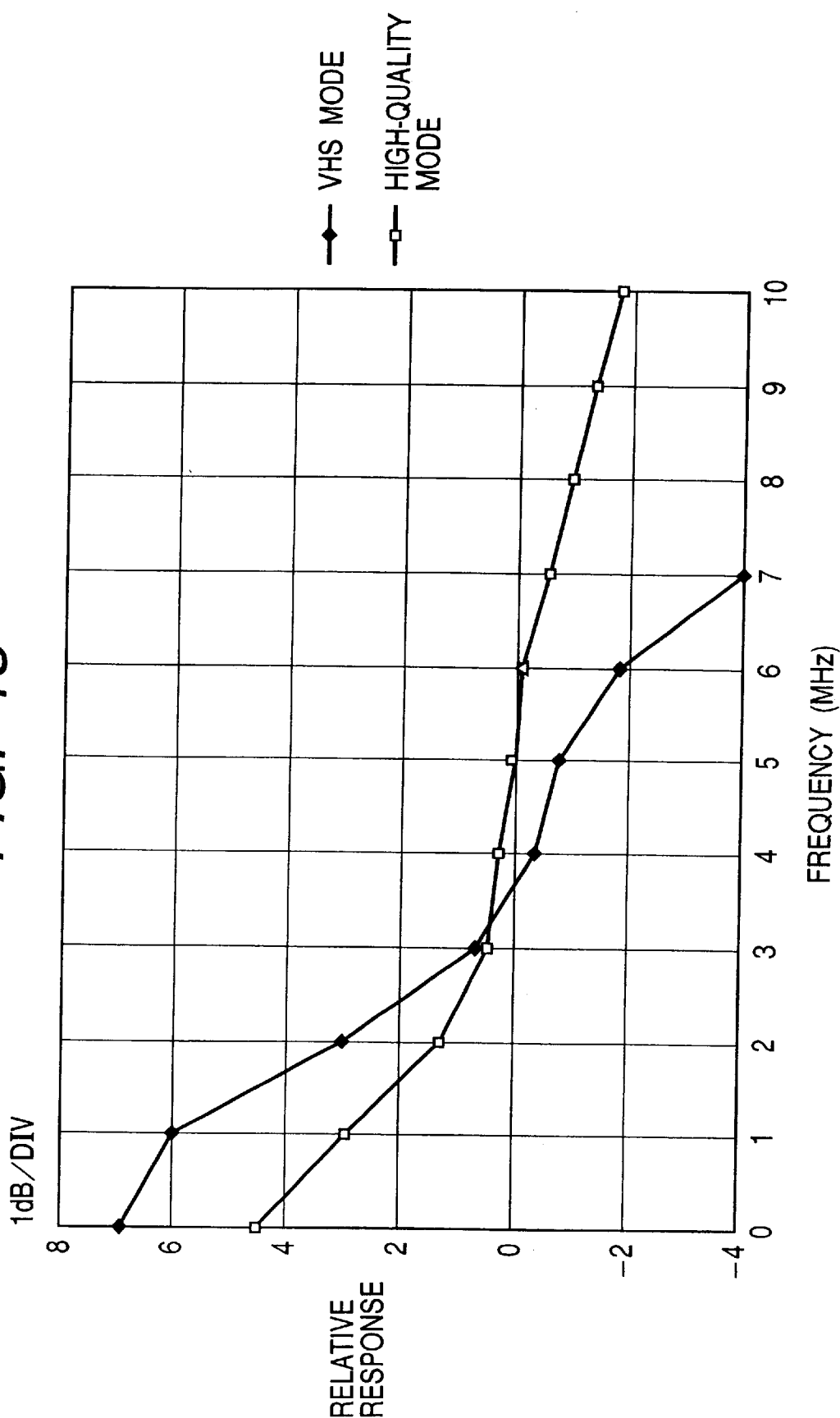
FIG. 13 is a diagram of the changeable frequency response of a recording current equalizer in the apparatus of FIG. 7.

As shown in FIG. 13, the frequency response of the recording current equalizer 31 can be changed between first and second types. The frequency response of the recording current equalizer 31 is set to the first type during the VHS recording mode of operation. The frequency response of the recording current equalizer 31 is set to the second type during the high-quality recording mode of operation. The frequency response of the second type (the high-quality type) provides greater suppression of low-frequency signal components and less suppression of high-frequency signal components than those provided by the frequency response of the first type (the VHS type).

During the high-quality recording mode of operation, the recording amplifier 32 is controlled by the microcomputer 33 so as to provide a greater recording current than that provided in the VHS recording mode of operation.

In the case where the recording-mode setting switch 36 is in its VHS position or the high-quality position, the microcomputer 33 continues to deactivate the tape characteristic detector 34. When the recording-mode setting switch 36 is in its VHS position, the microcomputer 33 forces the apparatus of FIG. 7 to operate in the VHS recording mode. When the recording-mode setting switch 36 is in its high-quality position, the microcomputer 33 forces the apparatus of FIG. 7 to operate in the high-quality recording mode.

Fourth Embodiment

FIG. 14 shows a magnetic recording apparatus according to a fourth embodiment of this invention. The magnetic recording apparatus of FIG. 14 is similar to the magnetic recording apparatus of FIG. 7 except for design changes indicated later.

The magnetic recording apparatus of FIG. 14 includes an identification hole detector 35 connected to the microcomputer 33. The tape characteristic detector 34 (see FIG. 7) is omitted from the apparatus of FIG. 14.

The device 35 detects whether an identification hole is present in or absent from the tape casette K. In general, a cassette containing an S-VHS tape has an identification hole. On the other hand, a cassette containing a VHS tape does not have any identification hole. Accordingly, when the device 35 detects the presence of an identification hole in the tape cassette K, it is decided that the magnetic tape in the cassette K is of the S-VHS type. On the other hand, when the device 35 detects the absence of an identification hole from the tape cassette K, it is decided that the magnetic tape in the cassette K is of the VHS type. The identification hole detector 35 outputs a signal to the microcomputer 33 which represents whether an identification hole is present in or absent from the tape casette K, that is, whether the magnetic tape in the cassette K is of the S-VHS type or the VHS type.

In the case where the recording-mode switch 36 is in its OFF position, the magnetic recording apparatus of FIG. 14 operates as follows. When the tape cassette K is placed into the magnetic recording apparatus, the device 35 detects whether an identification hole is present in or absent from the tape casette K. In the presence of an identification hole, the device 35 decides that the magnetic tape in the cassette K is of the S-VHS type. In the absence of an identification hole, the device 35 decides that the magnetic tape in the cassette K is of the VHS type. The identification hole detector 35 informs the microcomputer 33 of whether the magnetic tape in the cassette K is of the VHS type or the S-VHS type.

When the magnetic tape in the cassette K is decided to be of the VHS type, the microcomputer 33 operates the apparatus of FIG. 14 in the VHS recording mode. When the magnetic tape in the cassette K is decided to be of the S-VHS type, the microcomputer 33 operates the apparatus of FIG. 14 in the high-quality recording mode.

In the case where the recording-mode setting switch 36 is in its VHS position or the high-quality position, the microcomputer 33 sets the recording mode of operation of the apparatus of FIG. 14 in response to the position of the recording-mode setting switch 36 but independently of the output signal of the identification hole detector 35. Specifically, when the recording-mode setting switch 36 is in its VHS position, the microcomputer 33 forces the apparatus of FIG. 14 to operate in the VHS recording mode. When the recording-mode setting switch 36 is in its high-quality position, the microcomputer 33 forces the apparatus of FIG. 14 to operate in the high-quality recording mode.

What is claimed is:

1. A magnetic recording apparatus comprising:
   first means for recording a video signal of a first standard format, which has a first luminance frequency band, on a magnetic tape of a first standard type designed to record a video signal of the first standard format during a standard operation anode;
   second means for recording a video signal of a second standard format, which has a second luminance frequency band wider than the first luminance frequency band, on a magnetic tape of a second standard type designed to record a video signal of the second standard format during a true high-quality operation mode;
   third means for recording a video signal of a high-quality format, which has a third luminance frequency band equal to the second luminance frequency band, on a magnetic tape of the first standard type during a quasi high-quality operation mode;
   a preemphasis circuit for emphasizing high-frequency components of a first luminance signal in an input video signal to generate a second luminance signal;
   an FM modulation circuit for modulating a frequency of a carrier in accordance with the second luminance signal to generate a third luminance signal, the third luminance signal being an FM modulation luminance signal;
   an adder for multiplexing the FM modulation luminance signal and a chrominance signal in the input video signal into a record signal on a frequency multiplexing basis; and
   a recording circuit for recording the record signal on a recording tape;
   wherein a degree of emphasizing by the preemphasis circuit during the quasi high-quality operation mode is lower, by an emphasis difference quantity, than that during the standard operation mode and the true high-quality operation mode concerning signal components having frequencies of at least 1 MHz or higher, and the emphasis difference quantity increases as a signal frequency rises, and wherein a frequency deviation provided by the FM modulation circuit during the quasi high-quality operation mode is greater than that during the standard operation mode and is equal to that during the true high-quality operation mode.

2. A magnetic recording apparatus as recited in claim 1, wherein the frequency deviation provided by the FM modulation circuit during the quasi high-quality operation mode is 5.4 MHz to 7.0 MHz.

3. A magnetic recording apparatus as recited in claim 1, further comprising a white clip circuit provided between the preemphasis circuit and the FM modulation circuit for adjusting a white clip level of the second luminance signal, and wherein the white clip level during the quasi high-quality operation mode is lower than that during the true high-quality operation mode.

4. A magnetic recording apparatus as recited in claim 1, further comprising a white clip circuit connected between the preemphasis circuit and the FM modulation circuit for adjusting a white clip level of the second luminance signal, wherein the white clip level during the quasi high-quality operation mode is lower than that during the true high-quality operation mode, and wherein the frequency deviation provided by the FM modulation circuit during the quasi high-quality operation mode is 5.4 MHz to 7.0 MHz.

5. A magnetic recording apparatus as recited in claim 1, further comprising a white clip circuit provided between the preemphasis circuit and the FM modulation circuit for adjusting a white clip level of the second luminance signal, and wherein the white clip level during the quasi high-quality operation anode is equal to 190%±10%.

6. A magnetic recording apparatus as recited in claim 1, further comprising:
 an identification hole detector for detecting whether an identification hole is present in or absent from a housing containing a magnetic tape in question to determine whether the magnetic tape in question is of the first standard type or the second standard type, wherein a housing containing a magnetic tape of the second standard type has an identification hole while a housing containing a magnetic tape of the first standard type lacks an identification hole;
 a tape characteristic detector for detecting characteristics of the magnetic tape in question; and
 fourth means for, in cases where the identification hole detector determines that the magnetic tape in question is of the first standard type, selecting one from the first means and the third means and activating the selected one in response to the characteristics of the magnetic tape in question which are detected by the tape characteristic detector.

7. A magnetic recording apparatus as recited in claim 1, further comprising:
 fourth means for recording a test signal on a magnetic tape in question which is of the first standard type;
 fifth means for reproducing the test signal from the magnetic tape in question; and
 sixth means for activating the third means in cases where a level of the test signal reproduced by the fifth means is greater than a prescribed level.

8. A magnetic recording apparatus as recited in claim 7, wherein a recording level of the test signal is equal to a recording level of a video signal during the quasi high-quality operation mode.

9. A magnetic recording apparatus as recited in claim 7, wherein the fourth means records the test signal at a plurality of different recording levels, and the third means records a video signal at a recording level equal to one among the plurality of the different recording levels at which a reproduction level is maximized.

10. A magnetic recording apparatus as recited in claim 1, further comprising fourth means for selecting one from the first means and the third means and activating the selected one in response to user's request.

* * * * *